United States Patent
Kim

(10) Patent No.: US 11,881,026 B2
(45) Date of Patent: Jan. 23, 2024

(54) NIGHTTIME ROAD FOG DETECTION SYSTEM USING OPEN INFORMATION OF CCTV AND DETECTION METHOD THEREOF

(71) Applicant: The Seoul Institute, Seoul (KR)

(72) Inventor: Kyungwon Kim, Seoul (KR)

(73) Assignee: The Seoul Institute, Seoul (KR)

( * ) Notice: Subject to any disclaimer, the term of this patent is extended or adjusted under 35 U.S.C. 154(b) by 0 days.

(21) Appl. No.: 17/579,093

(22) Filed: Jan. 19, 2022

(65) Prior Publication Data
US 2023/0215177 A1   Jul. 6, 2023

(30) Foreign Application Priority Data

Jan. 4, 2022  (KR) .................. 10-2022-0000831

(51) Int. Cl.
*G06V 20/52*  (2022.01)
*G06V 10/56*  (2022.01)
*G06V 10/44*  (2022.01)
*G06V 10/764*  (2022.01)

(52) U.S. Cl.
CPC .............. *G06V 20/52* (2022.01); *G06V 10/44* (2022.01); *G06V 10/56* (2022.01); *G06V 10/764* (2022.01)

(58) Field of Classification Search
CPC ........................................ G06T 7/13
See application file for complete search history.

(56) References Cited

U.S. PATENT DOCUMENTS

| | | | | |
|---|---|---|---|---|
| 2016/0026893 A1* | 1/2016 | Hoya | ................ | G06T 7/90 382/165 |
| 2018/0314902 A1* | 11/2018 | Suzuki | ................ | G06F 16/5838 |

FOREIGN PATENT DOCUMENTS

| | | | | |
|---|---|---|---|---|
| KR | 100946749 B1 * | 3/2010 | ............... | G08G 1/04 |
| KR | 10-1219659 B1 | 1/2013 | | |
| KR | 101219659 B1 * | 2/2013 | ............... | G06T 7/00 |
| KR | 101748524 B1 * | 6/2017 | ............... | G06T 7/13 |
| KR | 101949968 B1 * | 2/2019 | ............... | G06T 7/55 |
| KR | 102267517 B1 * | 7/2020 | ............. | G06V 20/00 |

(Continued)

OTHER PUBLICATIONS

Spinneker R, Koch C, Park SB, Yoon JJ. Fast fog detection for camera based advanced driver assistance systems. In 17th International IEEE Conference on Intelligent Transportation Systems (ITSC) Oct. 8, 2014 (pp. 1369-1374). IEEE. (Year: 2014).*

(Continued)

*Primary Examiner* — Clifford Hilaire
(74) *Attorney, Agent, or Firm* — Sughrue Mion, PLLC

(57) ABSTRACT

Disclosed is a nighttime road fog detection system. More specifically, the present invention relates to a nighttime road fog detection system which rapidly and accurately detects the time of occurrence of nighttime fog that occurs at dawn before sunrise using open information of closed-circuit television (CCTV) cameras installed on a road and a detection method thereof. According to an embodiment of the present invention, in a mapping image obtained by masking a fog region identified by a fog detection program on an image signal, a region incorrectly determined due to a whitening phenomenon caused by an external light source generated at night is corrected, and thus information about the fog region is more accurately provided.

6 Claims, 8 Drawing Sheets

(56) References Cited

FOREIGN PATENT DOCUMENTS

KR     10-2267517  B1     6/2021
KR      102267517  B1  *  6/2021   ......... G06K 9/00624

OTHER PUBLICATIONS

Bronte S, Bergasa LM, Alcantarilla PF. Fog detection system based on computer vision techniques. In2009 12th International IEEE conference on intelligent transportation systems Oct. 4, 2009 (pp. 1-6). IEEE. (Year: 2009).*

* cited by examiner

NIGHTTIME ROAD FOG DETECTION SYSTEM USING OPEN INFORMATION OF CCTV AND DETECTION METHOD THEREOF

CROSS-REFERENCE TO RELATED APPLICATION

This application claims priority to and the benefit of Korean Patent Application No. 10-2022-0000831, filed on Jan. 4, 2022, the disclosure of which is incorporated herein by reference in its entirety.

BACKGROUND

1. Field of the Invention

The present invention relates to a nighttime road fog detection system, and more particularly, to a nighttime road fog detection system which rapidly and accurately detects the time of occurrence of nighttime fog that occurs at dawn before sunrise using open information of closed-circuit television (CCTV) cameras installed on a road and a detection method thereof.

2. Discussion of Related Art

Large-scale traffic accidents on roads occur repeatedly due to bad weather such as fog, snow, rain, wind, or the like and the socioeconomic damage caused by loss of life is also increasing. In particular, fog is highly likely to cause serious traffic accidents by obstructing the driver's view, making it difficult for the driver to secure a safe distance, and increasing a deviation of driving speed.

In preparation for the degradation of smooth traffic and stability of the road due to bad weather such as fog, snow, rain, wind, or the like, the Korea Meteorological Administration uses a visibility system to detect fog. However, the visibility system has a limitation in that an installation site thereof is limited due to a high cost.

Accordingly, a plurality of studies for detecting fog using an image have been recently conducted. As currently disclosed fog detection methods, there are a method of detecting fog by extracting several fog features from an input image and measuring the similarity between the fog features and pieces of learning data, a method of detecting nighttime fog by calculating a visible distance using a headlight of a vehicle, and the like.

Among the above methods, in Korean Patent Registration No. 10-2267517, which is a document of the related art, a fog monitoring device that receives an image transmitted from a network configuration device, analyzes the image, detects fog, and outputs an alert according to each preset crisis level is disclosed. According to the document of the related art, it can be seen that a technique for detecting fog during the day itself has already reached a level of completion.

However, the fog on the road is characterized by mainly occurring between night and dawn. Images of nighttime fog which are photographed by CCTVs installed on the road are monochrome images, and thus it is difficult to distinguish between the fog and the surrounding environment in the images.

In particular, a whitening phenomenon may occur due to headlights of vehicles traveling on the road. The whitening phenomenon is displayed in a form similar to the fog in the image, and thus the whitening phenomenon is incorrectly detected as the fog by a conventional fog monitoring device and causes degradation of the quality of a monitoring screen.

Therefore, a technique for controlling a fog monitoring device not to incorrectly detect a region as fog by an external light source such as a headlight of a vehicle at night is urgently required to be developed.

Document of Related Art

Patent Document

Korean Patent Registration No. 10-1219659 (Published on Jan. 9, 2013)
Korean Patent Registration No. 10-2267517 (Published on Jun. 15, 2021)

SUMMARY OF THE INVENTION

In order to solve the above-described problems of the present invention, the present invention is directed to providing a nighttime road fog detection system which rapidly and accurately detects the time of occurrence of nighttime fog that occurs at dawn before sunrise using open information of closed-circuit television (CCTV) cameras installed on a road and provides intensity information of the fog to the Ministry of Land, Infrastructure, and Transport, the Korea Meteorological Administration, and road management agencies of local governments according to each crisis level.

According to an aspect of the present invention, there is provided a nighttime road fog detection system including an image collecting unit configured to search for and collect image signals obtained by photographing a road to be monitored from one or more CCTV cameras installed at respective points on the road to be monitored in real time, an image analysis unit configured to use a fog detection algorithm to determine edges of fog appearing in the image signals and identify a fog region from the determined edges, a result display unit configured to extract red (R), green (G), and blue (B) color information for each pixel of the image signals from edges of the identified fog region, generate a mapping image including a masking region using the R, G, and B color information, superimpose the mapping image on the image signals, and output the image signals on which the mapping image is superimposed, a time discrimination unit configured to compare the R, G, and B color information with reference color information and set a nighttime threshold value for determining day or night, and a mapping correction unit configured to remove a masking region corresponding to a whitened region generated by an external light source at night from the mapping image on the basis of the nighttime threshold value for each of the points at which the CCTV cameras are installed.

The image collecting unit may use an open information application program interface (API) that is provided by a public data portal to access the CCTV camera remotely and collect the image information.

R, G, and B color information extracted from an image captured at sunrise by a CCTV camera installed at a highest altitude of a representative region among regions of a country may be determined as the reference color information.

The mapping correction unit may detect R, G, and B color information of the fog region to assign X and Y coordinates to the fog region, classify a region of the fog region, in which the X and Y coordinates are not changed for more than a certain period of time, as a fixed light source, and classify a region of the fog region, in which the X and Y coordinates are changed, as a moving light source.

When the fixed light source appears in the image signal, the mapping correction unit may remove a masking region corresponding to the fixed light source from the mapping image, generate an $N^{th}$ frame (N is a natural number), and set an $(N+1)^{th}$ frame to be the same as the $N^{th}$ frame.

When the moving light source appears in the image signal, the mapping correction unit may correct the nighttime threshold value according to environment setting information for each point and set a previous $(N-1)^{th}$ frame in the mapping images which is generated until the moving light source deviates from the image signal on the basis of the corrected nighttime threshold value, to be the same as an $N^{th}$ frame.

When the road to be monitored is a straight road, the mapping correction unit may maintain the original nighttime threshold value, when the road is a curved road or a horizontal road, the mapping correction unit may subtract a first correction variable from the original nighttime threshold value, and when the road is not a horizontal road, the mapping correction unit may additionally subtract a second correction variable from the nighttime threshold value from which the first correction value is subtracted.

When a surrounding environmental factor such as snow or rain occurs, the mapping correction unit may calculate difference values between R, G, and B edge values normally obtained from the image signal and R, G, and B edge values obtained from the image signal at a current time point for each R, G, and B, calculate an average value of the difference values, determine that a region, in which current R, G, and B color information is a certain level or more or a certain level or less based on the average value, is a noise region, and exclude the region from a whitened region.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
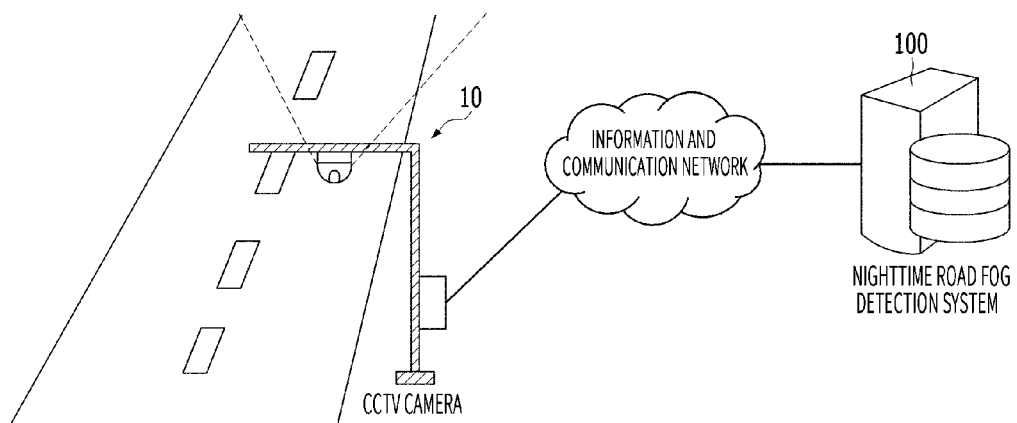
FIG. 1 is a schematic diagram illustrating a connection structure of an entire system to which a nighttime road fog detection system according to an embodiment of the present invention is applied.

Hereinafter, a nighttime road fog detection system of the present invention will be described in detail with reference to the accompanying drawings and embodiments.

It should be noted that the technological terms used in the present invention are only used to describe specific embodiments and are not intended to limit the present invention. Further, the technological terms used in the present invention should be interpreted as meanings generally understood by one of ordinary skill in the art to which the present invention belongs, and the technological terms should not be interpreted in an excessively inclusive meaning or in an excessively reduced meaning, unless specifically defined in the present invention otherwise. Further, when the technological term used in the present invention is an incorrect technical term that does not accurately display the spirit of the present invention, it should be understood by being replaced with a technological term that can be correctly understood by those skilled in the art. Further, general terms used in the present invention should be interpreted as defined in advance or according to the context before and after and should not be interpreted in an excessively reduced meaning.

Further, as used herein, the singular forms "a" and "an" are intended to also include the plural forms, unless the context clearly indicates otherwise. In the present invention, terms "comprises" or "includes" should not be construed as necessarily including all of several elements or several operations described in the invention, and should be construed as some elements or some operations may not be included or as additional elements or additional operations may be further included.

Further, it will be understood that, although the terms "first," "second," etc. may be used herein to describe various elements, these elements should not be limited by these terms. These terms may only be used to distinguish one element from another. For example, a first element could be termed a second element, and, similarly, a second element could be termed a first element, without departing from the scope of the present invention.

Hereinafter, exemplary embodiments will be described in detail with reference to the accompanying drawings, the same or corresponding components are denoted by the same reference numerals regardless of reference numbers, and thus the description thereof will not be repeated.

Further, in descriptions of the present invention, when detailed descriptions of related known configurations or functions are deemed to unnecessarily obscure the gist of the present invention, they will be omitted. Further, the accompanying drawings are only examples to facilitate overall understanding of the spirit of the present invention and it should be noted that the spirit of the present invention is not limited to the accompanying drawings.

In the following description, the term referring to a "nighttime road fog detection system" according to an embodiment of the present invention may be denoted as "fog detection system" or "system" for convenience of description.

Hereinafter, a nighttime road fog detection system according to an embodiment of the present invention will be described in detail with reference to the accompanying drawings.

FIG. 1 is a schematic diagram illustrating a connection structure of an entire system to which a nighttime road fog detection system according to an embodiment of the present invention is applied.

Referring to FIG. 1, a nighttime road fog detection system 100 according to the embodiment of the present invention may access closed-circuit television (CCTV) cameras 10, which are installed adjacent to expressways, national highways, bridges, and local ways of the country and are being operated by the Ministry of Land, Infrastructure, and Transport, the National Police Agency, local governments, and the like in order to measure traveling vehicles, roads and surrounding conditions, traffic, etc., through an information and communication network to collect image signals, identify a fog region generated on a road in the image signals using an installed fog detection program, and mask the fog region so that a control room and the like can easily identify the fog region.

The CCTV cameras 10 may be installed above surfaces of roads, which are operated by the Ministry of Land, Infrastructure, and Transport, the National Police Agency, local governments and on which vehicles travel, such as city roads, national highways, expressways, and the like, and may photograph vehicle movement, traffic volume, and the like in real time. The CCTV camera 10 may be connected to the information and communication network through a network device and may transmit captured image signals to a local control room or the like.

Further, the CCTV camera 10 may disclose an image as an open information image on-line according to the operator's intention. The National Transport Information Center, the Urban Traffic Information Center, or the like may disclose an open information interface (open application programming interface (API)) according to information opening policies and allow people, who need image information, to search for CCTV images in regions where fog occurs frequently, access the CCTV cameras remotely, and receive image signals.

The nighttime road fog detection system 100 may provide a masking screen that receives the image signal transmitted from the network device and analyzes the image signal to detect fog and that performs masking on the fog region in the image.

Specifically, the nighttime road fog detection system 100 may receive an image signal that is currently being photographed from the network device connected to the CCTV camera 10 installed in each region through the open information interface in real time and may store the image signal. Further, the system 100 may be equipped with a fog detection program for detecting fog using stored images, may receive an image environment setting for respective points where the CCTV cameras 10 are installed, receive a fog detection condition and a crisis level determination condition, and output a result of the detection according to the settings and conditions.

In particular, the nighttime road fog detection system 100 according to the embodiment of the present invention identifies a fog region appearing in the image signal through the fog detection program, extracts red (R), green (G), and blue (B) color information for each pixel of the image signal from edges of the identified fog region, generates a mapping image including a masking region, and outputs a result of fog detection. The nighttime road fog detection system 100 corrects the image signal by removing a masking region corresponding to a whitened region generated by an external light source at night from the mapping image on the basis of a nighttime threshold value for each point where the CCTV camera 10 is installed.

That is, in the present invention, in the generation of a mapping image that is used to identify and mask the fog region appearing in the image signal through the fog detection program, it is possible to remove a masking region incorrectly generated due to the characteristic of the whitened region generated by the external light source.

According to the above-described structure, the nighttime road fog detection system 100 according to the embodiment of the present invention may determine day or night by analyzing image signals for the road that are collected from one or more CCTV cameras installed in a remote place, and at night, the nighttime road fog detection system 100 may correct the masking region corresponding to the whitened region caused by the external light source appearing in the image to provide fog information more accurately.

Hereinafter, a nighttime road fog detection system according to an embodiment of the present invention will be described in detail with reference to the accompanying drawings.

Figure 2:
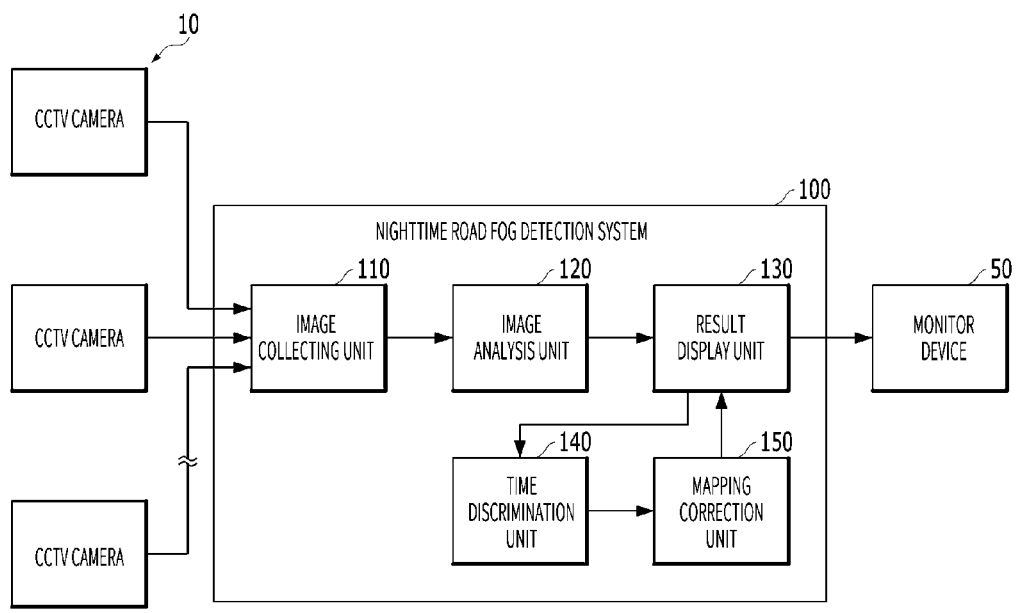
FIG. 2 is a diagram illustrating a structure of the nighttime road fog detection system according to the embodiment of the present invention.

FIG. 2 is a diagram illustrating a structure of a nighttime road fog detection system according to an embodiment of the present invention.

Referring to FIG. 2, a nighttime road fog detection system 100 according to the embodiment of the present invention may include an image collecting unit 110 that searches for and collects image signals obtained by photographing a road to be monitored from one or more CCTV cameras 10 installed at respective points on the road to be monitored in real time, an image analysis unit 120 that uses a fog detection algorithm to determine edges of fog appearing in the image signals and identify a fog region from the determined edges, a result display unit 130 that extracts R, G, and B color information for each pixel of the image signals from edges of the identified fog region, generates a mapping image including a masking region using the R, G, and B color information, superimposes the mapping image on the image signals, and outputs the image signals on which the mapping image is superimposed, a time discrimination unit 140 that compares the R, G, and B color information with reference color information and sets a nighttime threshold value for determining day or night, and a mapping correction unit 150 that removes a masking region corresponding to a whitened region generated by an external light source at night from the mapping image on the basis of the nighttime threshold value for each of the points at which the CCTV camera 10 are installed.

The image collecting unit 110 may collect the image signals obtained by photographing the road from one or more CCTV cameras 10 installed at a specific point in each region in real time. To this end, the image collecting unit 110 may be connected to a predetermined network device and may receive the image signal of each point in real time through the predetermined network device.

In particular, the image collecting unit 110 may use an open information API that is provided by a public data portal to access the CCTV camera 10 remotely and collect image information.

The image analysis unit 120 may use the installed fog detection algorithm to determine the edges of the fog appearing in the image signals collected from each point and identify the fog region from the determined edges.

Specifically, according to an embodiment of the present invention, the fog detection algorithm may be largely divided into a process of calculating a distance to a point where fog occurs and a process of detecting the fog.

First, in the process of calculating the distance to the point where the fog occurs, the distance to the point where the fog occurs is calculated using the collected image information. In this case, the distance is calculated by converting a road image into coordinates on a two-dimensional plane, a screen is divided into regions of a preset size, a position where an object (fixed object, etc.) appearing in the image is located in the image and an actual position thereof away from the actual CCTV camera 10 are displayed, and the road image is converted into the coordinates to check to what extent a viewing distance is secured when the fog occurs later.

In particular, the image analysis unit 120 determines a non-linear function to calculate a distance from an image. Components, that is, variables and constants, for calculating the distance include a longest coordinate $Y_{max}$, a fog detection coordinate Y, a longest distance $D_{max}$, a shortest distance $D_{min}$, a correction constant for shortest distance s, a correction constant for near distance n, a correction constant for far distance f, a correction constant for vertical angle v, a correction constant for effective distance e, an altitude H, a lens standard focal length $L_{std}$, a lens set focal length $L_{set}$, and the like. These components are summarized in Table 1 below.

the correction constant for effective distance, f denotes the correction constant for far distance, n denotes the correction constant for near distance, s denotes the correction constant for shortest distance, H denotes the altitude, $L_{set}$ denotes the lens set focal length, $L_{std}$ denotes the lens standard focal length, and v denotes the correction constant for vertical angle.

Further, the image analysis unit 120 may determine the constants (i.e., the correction constant for shortest distance, the correction constant for near distance, the correction constant for far distance, the correction constant for vertical angle, and the correction constant for effective distance) so that the distance to the point where the fog occurs in the image approximates the actual measured distance. Here, an upper limit of the correction constant for effective distance e may be determined as in Equation 2 below so that the calculated distance does not reach infinity.

$$e = D_{max} Y_{max} \left[ \frac{1}{1 - \left\{ \left( D_{max} - s \times H \times \frac{L_{set}}{L_{std}} \times e^v \right) \ln + 1 \right\}^{-\frac{1}{f}}} - 1 \right] \quad \text{[Equation 2]}$$

Further, the shortest distance to the image is affected by installation conditions of the camera and is determined by the altitude, the lens focal length, the correction constant for

TABLE 1

| Classification | Variable | Contents |
|---|---|---|
| Longest coordinate | $Y_{max}$ | A maximum value among Y coordinates to detect fog in an analysis image |
| Fog detection coordinate | Y | A Y coordinate of the detected fog |
| Longest distance | $D_{max}$ | A longest distance to the Y coordinate to identify the fog in the analysis image |
| Shortest distance | $D_{min}$ | A distance at which the Y coordinate is 0 in the analysis image |
| Correction constant for shortest distance | s | A constant for correcting the distance at which the Y coordinate is 0 in the analysis image as an actual value |
| Correction constant for near distance | n | A constant for correcting a near distance Y coordinate as an actual value when classifying according to perspective |
| Correction constant for far distance | f | A constant for correcting a far distance Y coordinate as an actual value when classifying according to perspective |
| Correction constant for vertical angle | v | A constant for correcting a shortest distance by reflecting an effect of a vertical angle of a camera |
| Correction constant for effective distance | e | A constant for correcting the distance so as to be effectively calculated |
| Altitude | H | A height above sea level where the camera is installed |
| Lens standard focal length | $L_{std}$ | A standard focal length of a lens of the camera |
| Lens set focal length | $L_{set}$ | A set focal length of the lens of the camera |

Further, the image analysis unit 120 may actually measure a distance to a space to be analyzed for fog generation of the image and may calculate a distance (range) R to the space to be analyzed of the image to the point where the fog occurs as shown in Equation 1.

$$R = n \left\{ \frac{D_{max}(Y_{max} - Y)}{e + D_{max} Y_{max}} \right\}^{-f} - n + sSHS \frac{L_{set}}{L_{std}} Se^v \quad \text{[Equation 1]}$$

Here, R denotes the distance to the point where the fog occurs, n denotes the short-distance correction constant, $D_{max}$ denotes the longest distance, $Y_{max}$ denotes the longest coordinate, Y denotes the fog detection coordinate, e denotes vertical angle, and the correction constant for shortest distance, and may be determined as in Equation 3 below.

$$D_{min} = sSHS \frac{L_{set}}{L_{std}} Se^v \quad \text{[Equation 3]}$$

The image analysis unit 120 may apply a function according to each distance to correct a difference in perspective of the image per image coordinate and may use a plurality of functions to improve the accuracy of the calculated distance. The setting conditions of a two-partition function, that is, an example function, determined to calculate the distance to the point where the fog occurs in the image are as in Table 2 below.

TABLE 2

| Classification | $Y_{max}$ | $D_{max}$ | $D_{min}$ | s | n | f | v | e | H | $L_{std}$ | $L_{set}$ |
|---|---|---|---|---|---|---|---|---|---|---|---|
| Section #1 | 89 | 1000 | 3.2332 | 1.08 | 3.9 | 1.275 | −2.4 | 1162.622 | 33 | 50 | 50 |
| Section #2 | 89 | 1000 | 13.2723 | 0.6 | 1.5E−15 | 3930 | −0.4 | 8480792 | 33 | 50 | 50 |

Figure 3A:
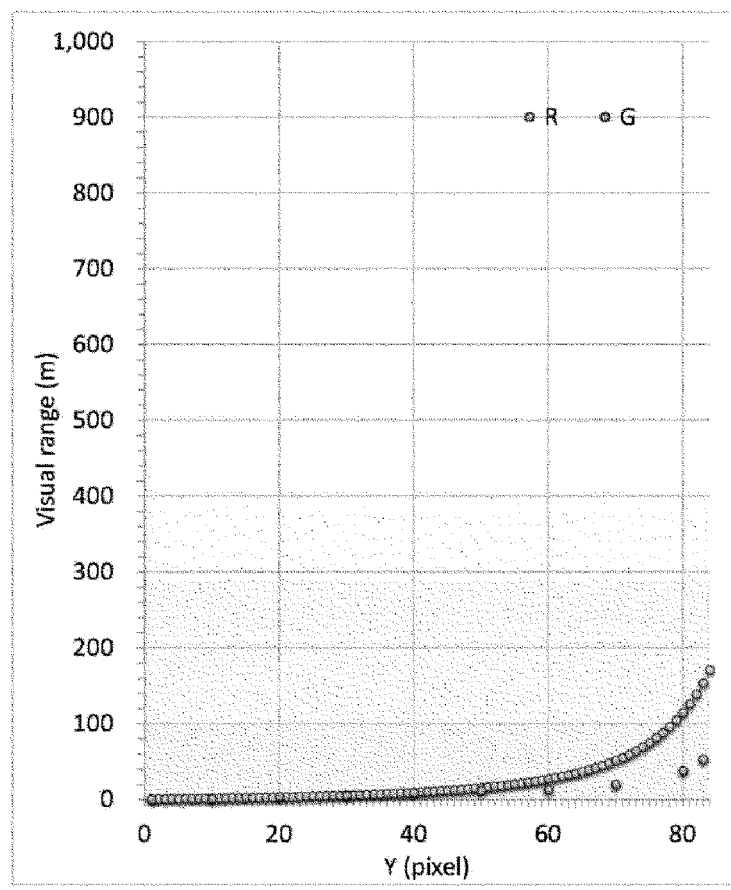
FIGS. 3A and 3B are comparison graphs of an actual measured distance and a calculated distance to fog in the nighttime road fog detection system according to the embodiment of the present invention.
Figure 3B:
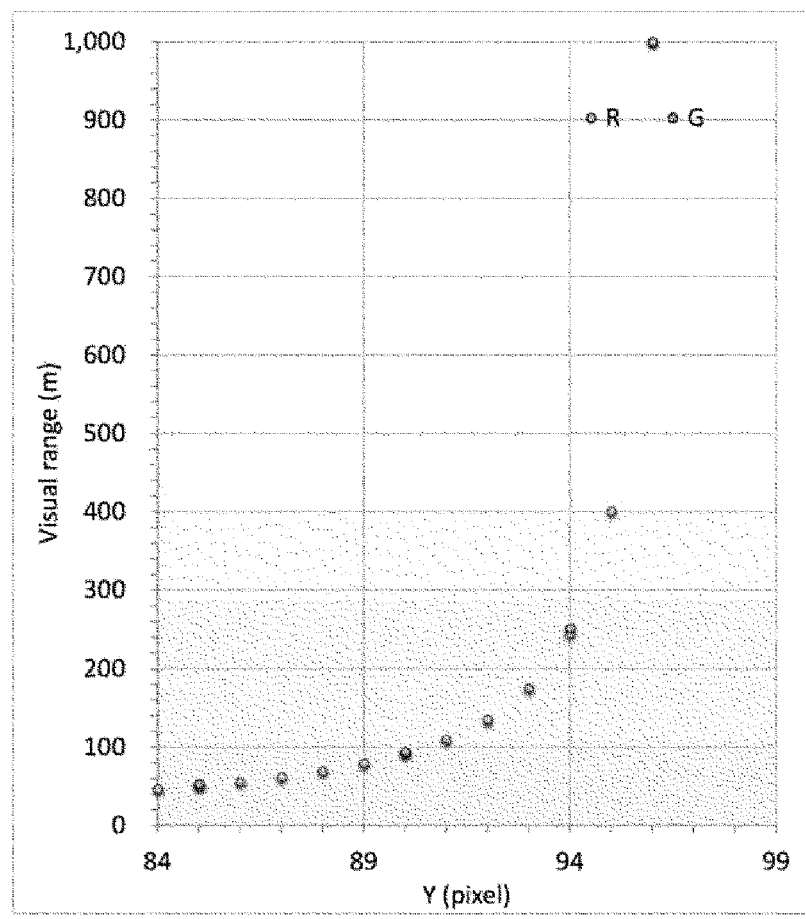

Further, an optimal Y coordinate divided so that the calculated distance become most approximate to the actual measured distance is determined, and the divided Y coordinate is called a split point, and in the example function, the divided Y coordinate is determined to be 84. Here, referring to FIGS. 3A and 3B, a graph of FIG. 3A shows a section of 1 to 84 pixels in an image converted into two-dimensional coordinates for comparison between an actual measured distance G and a calculated distance R, and a graph of FIG. 3B shows a section of 84 to 89 pixels in an image converted into two-dimensional coordinates for comparison between the actual measured distance G and the calculated distance R.

Here, a unit of the Y coordinate of the fog detected in the image is a pixel, a range of the Y coordinate is 0 to 100 pixels, and an interval corresponds to 0.1 pixels. In this case, the distance to the point where the fog occurs, which corresponds to the Y coordinate of the fog, may be calculated by a determined function, and the distance to the point where the fog occurs, which approximates the actual measured distance, may be calculated by dividing the function into multiple functions, and the function may be divided into three or more functions as necessary.

Next, in the process of detecting the fog, the image analysis unit 120 may determine the edges of the fog in the image and then determine the fog region from the determined edges to detect the fog. In the process of detecting the edges of the fog, the extraction intensity of the edges of the fog may be set, horizontal edges may be selected and separated from among a plurality of edges to select lower ends of vertical edges, the vertical edges may be excluded when the primary color of the vertical edges among the selected lower ends is chromatic, and the edges in the preset space to be analyzed may be determined as the edges of the fog. The edges of the fog may be determined through a Sobel edge detector.

The result display unit 130 may display the fog region using the detected edge of the fog. When the fog region is determined, the result display unit 130 may extract the edges of the preset space to be analyzed from the edges of the fog and determine R, G, and B color information of a color coordinate system from the edges of the preset space to be analyzed. In addition, a feature classification value of the fog may be determined based on the R, G, and B color information, and when R, G, and B color information of a coordinate neighboring any one coordinate in the edges of the preset space to be analyzed is smaller than the feature classification value of the fog, any one coordinate may be selected and the fog may be detected by displaying the selected any one coordinate on the space.

In this case, a flood fill technique may be used for the pattern recognition analysis used when displaying the fog region. The flood fill technique is a technique for filling the pattern of the fog with red and displaying the image by superimposing the pattern in the image, and the extraction intensity of the edges of the fog and the feature classification value of the fog may correspond to the system settings and may be input as a number. The region superimposed on the fog region may be defined as a masking region using the flood fill technique, and the result display unit 130 may transmit the mapping image, in which the original image and the masking region are superimposed, to a monitor device 50 or the like connected to the system 100 to display the mapping image.

The time discrimination unit 140 may compare the above-described R, G, and B color information with the reference color information to set the nighttime threshold value for determining day or night. Unlike the daytime, in the case of nighttime, a whitening phenomenon in which R, G, and B of some regions of the image are changed similarly to fog may occur due to external light sources such as street lamps and vehicle headlights installed at each point, and thus the time discrimination unit 140 may determine the current time of each point where the CCTV camera 10 is installed using the reference color information and the R, G, and B color information for each point.

Here, the reference color information may be determined as R, G, and B color information extracted from the image captured at sunrise by the CCTV camera installed at the highest altitude of a representative region among the regions of the country.

Further, the R, G, and B color information for each point may be affected by the sunrise time, the surrounding environment (e.g., weather, road, and topography), and the camera environment (e.g., angle of view and height), and may be determined differently for each CCTV point.

Accordingly, the time discrimination unit 140 may calculate a nighttime threshold value D for determining day or night at each point in consideration of the above factors, and the nighttime threshold value D may be appropriately corrected for each point by adding, by the mapping correction unit 150 to be described below, a correction value thereto in consideration of the sunrise time, environmental influences, and camera environmental influences described above.

The mapping correction unit 150 may correct the mapping image displayed on the monitor device 50 or the like by removing the masking region corresponding to the whitened region generated by the external light source at night from the mapping image on the basis of the above-described night threshold value for each point where the CCTV camera 10 is installed.

Figure 4:
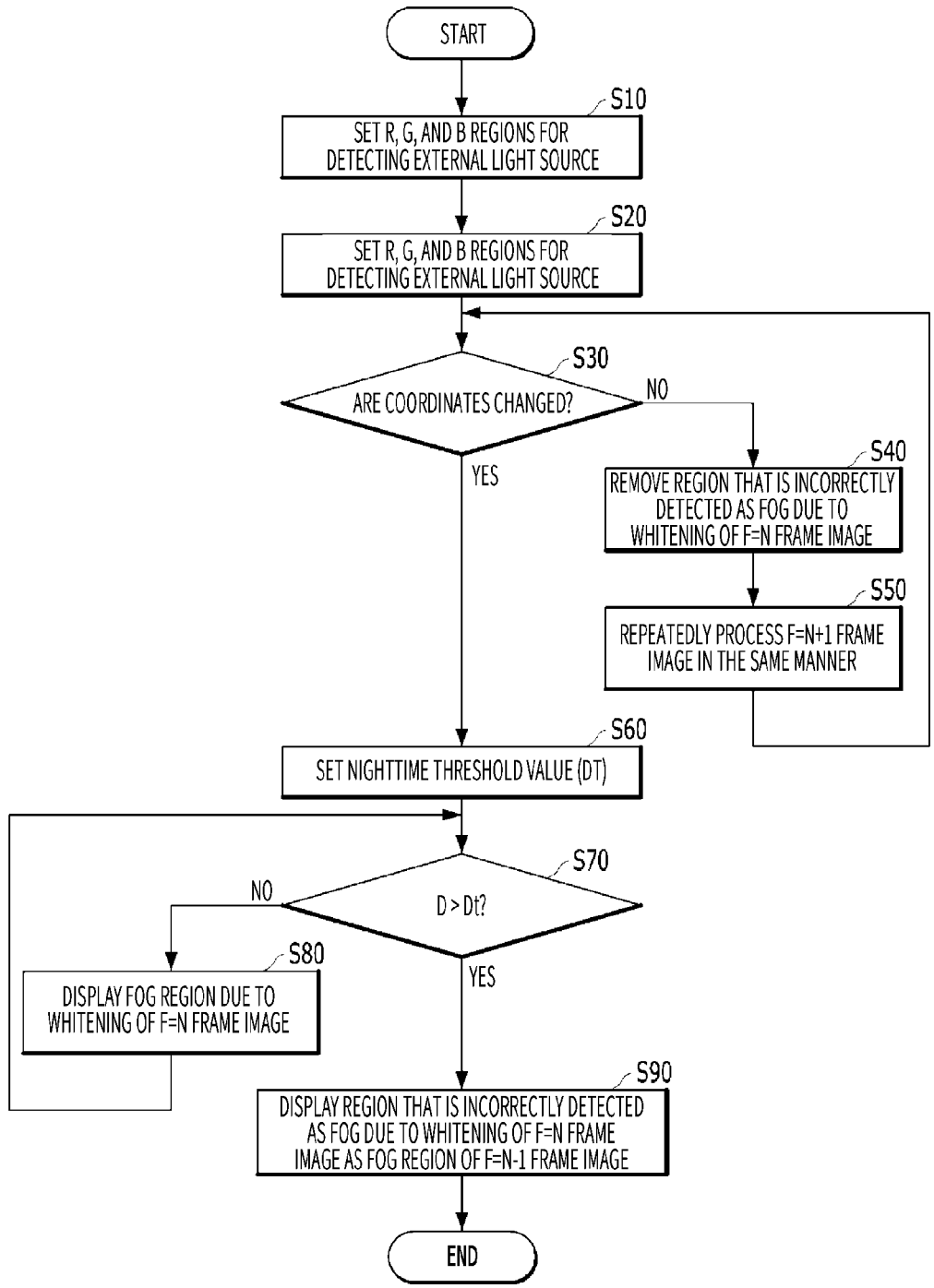
FIG. 4 is a flowchart illustrating a method of removing a whitened region performed by a mapping correction unit of the nighttime road fog detection system according to the embodiment of the present invention.

FIG. 4 is a flowchart illustrating a method of removing a whitened region performed by the mapping correction unit of the nighttime road fog detection system according to the embodiment of the present invention. Referring to FIG. 4, the mapping correction unit 150 detects the R, G, and B color information of the fog region generated by the external light source in the image that is analyzed by the image analysis unit 120 to set R, G, and B regions (S10).

Further, X and Y coordinates may be assigned to a region of the external light source (S20), a region in which the X and Y coordinates are not changed for a certain period of time or more may be classified as a fixed light source, and a region in which the X and Y coordinates are changed may be classified as a moving light source (S30).

Here, the fixed light source, which is the region in which the coordinates are not changed, refers to a street lamp or an indicator lamp installed at each point, and the X and Y coordinates thereof may be determined in advance because the fixed light source is turned on at night at a fixed location to generate a whitened region in a fixed manner. Therefore, when the R, G, and B color information deviates from the nighttime threshold value D due to the fixed light source, the mapping correction unit 150 may determine that the region is the whitened region instead of the fog region, may remove the masking region, which is the region that is incorrectly detected as fog and corresponds to the fixed light source, from the mapping image (S40) to generate an $N^{th}$ frame (N is a natural number), and may repeatedly set an $(N+1)^{th}$ frame to be the same as the $N^{th}$ frame (f=N+1) (S50).

Accordingly, the whitened region generated by the fixed light source in the mapping image at night is removed from the $N^{th}$ frame. Thereafter, as the $(N+1)^{th}$ frame is output in the same manner as the $N^{th}$ frame, the masking region for the whitened region in the mapping image that is superimposed on the original image signal and displayed is corrected (removed).

Further, the moving light source, which is a case in which the coordinates are changed, refers to a headlight of a vehicle traveling at each point, and the X and Y coordinates are changed because the moving light source is generated in the image during a certain period of time at night along the road to dynamically generate the whitened region. Accordingly, the mapping correction unit 150 may set a nighttime threshold value Dt (S60), correct the original nighttime threshold value D according to the environment setting information for each point that is a source of the image information, and set an $(N-1)^{th}$ frame as the $N^{th}$ frame in the mapping image until the moving light source deviates from the image signal on the basis of the corrected nighttime threshold Dt.

Here, the whitening phenomenon caused by the moving light source may be affected by various environmental factors such as a shape of the road at each point, a moving speed of the vehicle, an angle of view of the camera, and the like. Accordingly, the mapping correction unit 150 may correct the nighttime threshold value on the basis of the shape of the road. When the corresponding point is a straight road, the nighttime threshold value D provided by the time discrimination unit 140 is used without change, and when the road is not a straight road but is a curved road or the like, an experimentally derived first correction variable γ may be subtracted from the nighttime threshold value D (D−γ).

Further, when the road is neither a straight road nor a horizontal road, the nighttime threshold value may be corrected by further subtracting (D−γ−δ) an experimentally derived second correction variable δ from the nighttime threshold value (D−γ) from which the first correction variable γ is subtracted.

That is, when the road to be monitored is a straight road, the mapping correction unit 150 may maintain the original nighttime threshold value D, when the road is a curved road or a horizontal road, the mapping correction unit 150 may subtract the first correction variable γ from the original nighttime threshold value, and when the road is neither a curved road nor a horizontal road, the mapping correction unit 150 may calculate the corrected nighttime threshold value Dt by further subtracting the second correction variable δ from the nighttime threshold value from which the first correction variable γ is subtracted. In the case in which the moving light source is generated at night, when the corrected nighttime threshold value Dt is greater than or equal to the original nighttime threshold value D (D≤Dt), the fog region generated by the whitening phenomenon is displayed in the current frame (f=N) of the image (S80).

Further, when the corrected nighttime threshold value Dt is smaller than the original nighttime threshold value D (D>Dt), the $N^{th}$ frame including the whitened region in the mapping image is replaced with the $(N-1)^{th}$ frame (f=N−1) (S90), and thus the masking region for the whitened region in the mapping image that is superimposed on the original image signal and displayed is corrected (removed).

In particular, according to an embodiment of the present invention, a phenomenon, in which noise such as blur caused by snow, rain, or the like among the surrounding environment factors is incorrectly detected as a whitened region, may often occur, and the mapping correction unit 150 may further include a differential filter to reduce such a problem.

The differential filter extracts edge values for the detected whitened region to extract edges of the image and performs differentiation in horizontal and vertical directions. The differentiation in the horizontal direction may be performed using the same X coordinates and a difference value between pixels corresponding to upper and lower sides of the Y coordinate based on one pixel F (X, Y), and the differentiation in the vertical direction may be performed using the same Y coordinate and a difference value between pixels corresponding to upper and lower sides of the X coordinate. When the surrounding environmental factor such as snow, rain, or the like occurs, R, G, and B color information and R, G, and B edge values may be calculated by the differential filter to identify and remove the noise region.

Specifically, when the surrounding environmental factor such as snow, rain, or the like occurs, the mapping correction unit 150 may calculate difference values between the R, G, and B edge values that are normally obtained from the image signal and the R, G, and B edge values that are obtained at the current time point for each of R, G, and B, and calculate an average value of the difference values. When the current R, G, and B color information is a certain level or more or a certain level or less based on the average value, the mapping correction unit 150 may determine that the corresponding region is the noise region and may exclude the corresponding region from the whitened region.

Hereinafter, a method of removing a whitened region from a mapping image performed by the nighttime road fog detection system according to the embodiment of the present invention will be described with reference to the accompanying drawings.

Figure 5:
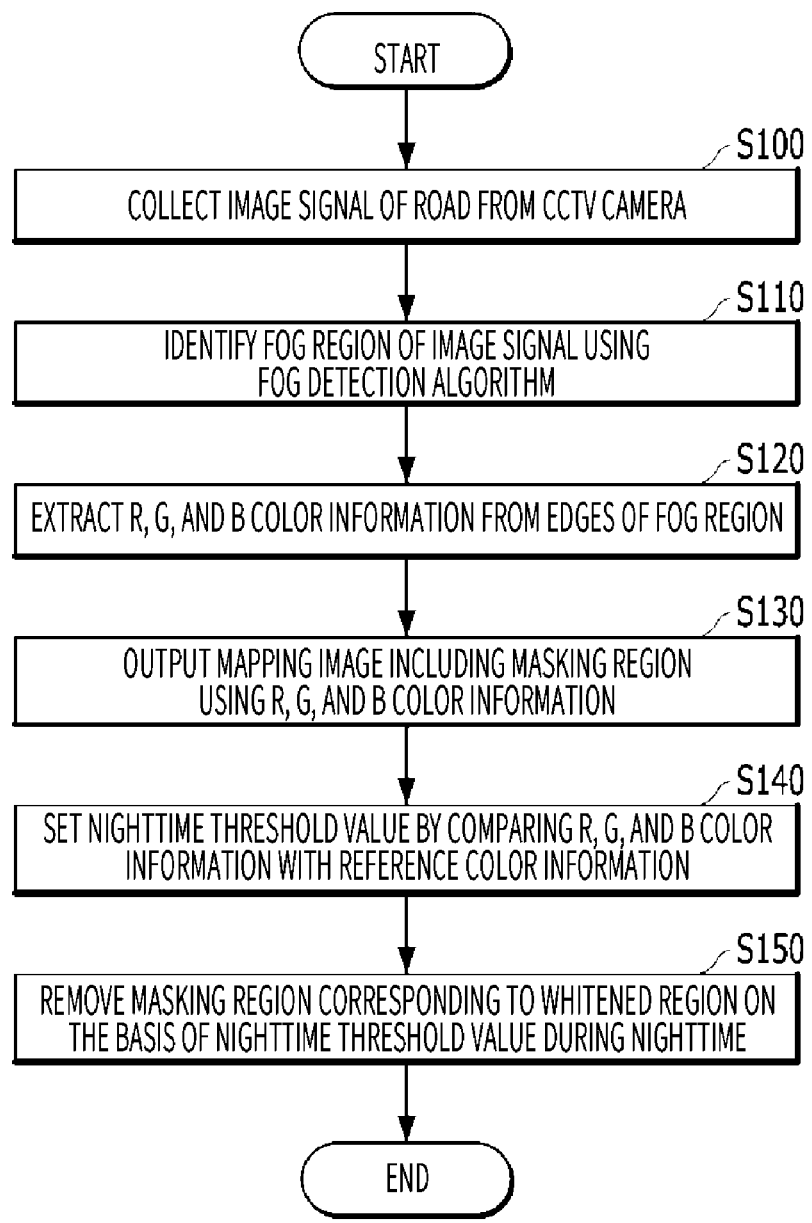
FIGS. 5 and 6 are flowcharts illustrating a method of removing a whitened region from a mapping image performed by the nighttime road fog detection system according to the embodiment of the present invention.
Figure 6:
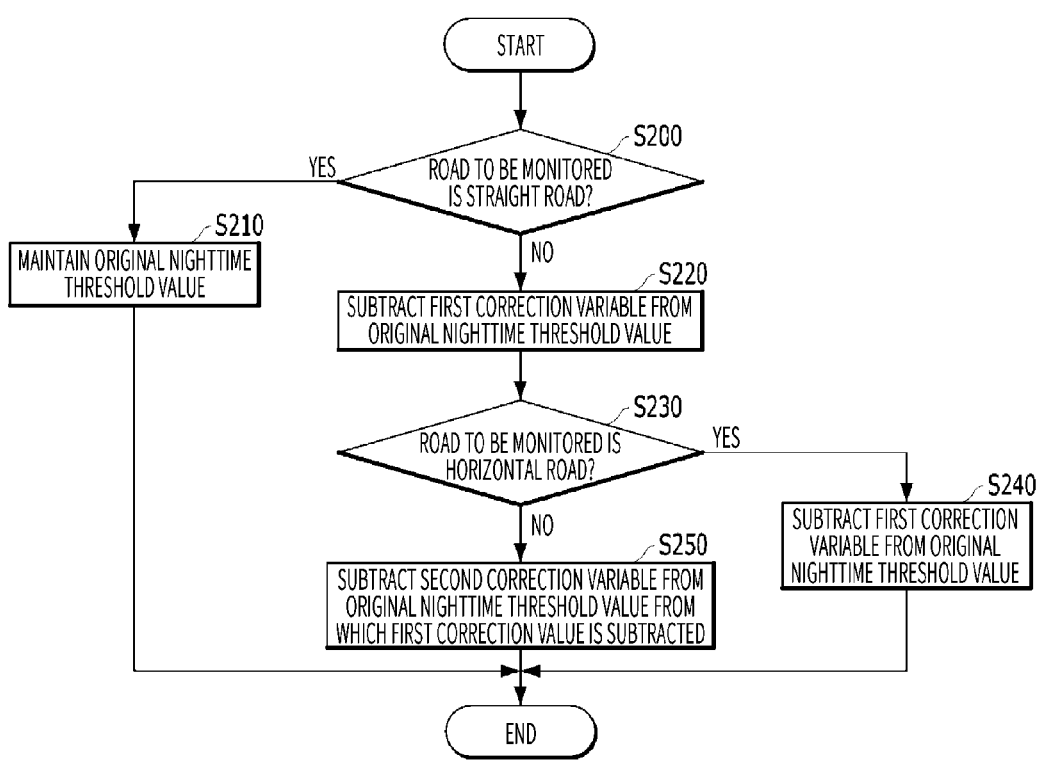

FIGS. 5 and 6 are flowcharts illustrating a method of removing a whitened region from a mapping image performed by the nighttime road fog detection system according to the embodiment of the present invention. In the following description, an execution subject of each operation is the nighttime road fog detection system of the present invention and components thereof unless otherwise stated.

First, referring to FIG. 5, according to the method of removing the whitened region from the mapping image performed by the nighttime road fog detection system according to the embodiment of the present invention, the system searches for and collects image signals obtained by photographing a road to be monitored from one or more CCTV cameras installed at respective points on the road to be monitored in real time (S100).

Next, the system uses a fog detection algorithm to determine edges of fog appearing in the image signals collected for each point and identify a fog region from the determined edges (S110). In this operation, the fog region may be identified using a fog removal algorithm applied to the system of the present invention as shown in Equations 1 to 3 described above.

Next, the system extracts R, G, and B color information for each pixel of the image signals from edges of the identified fog region (S120). The system may extract the edges of the fog using the above-described fog removal algorithm, determine R, G, and B color information of a color coordinate system from the edges, and determine a feature classification value of the fog on the basis of the determined R, G, and B color information.

Next, the system generates a mapping image including a masking region using the R, G, and B color information and superimposes the mapping image on the image signals and outputs the image signals on which the mapping image is superimposed (S130). When R, G, and B color information of a coordinate neighboring any one coordinate in edges of a space to be analyzed is smaller than the feature classification value of the fog, any one coordinate may be selected. The system detects the fog by displaying the selected any one coordinate on the space, defines the region superimposed on the fog region as a masking region using a flood fill technique, and displays the mapping image obtained by superimposing the masking region on the original image.

Next, the system compares the R, G, and B color information with a reference color information to set a nighttime threshold value for determining day or night (S140). A whitening phenomenon occurs in the image due to an external light source at night, and thus the system determines that a current time at each point is day or night using the R, G, and B color information of each point and the reference color information, which is the R, G, and B color information extracted from the image captured at sunrise by the CCTV camera installed at a highest altitude of a representative region among the regions of the country.

Further, when the current time is night, the system removes the masking region corresponding to the whitened region generated by the external light source from the mapping image on the basis of the nighttime threshold value for each point where the CCTV camera is installed (S150). When the external light source is a fixed light source, the whitened region is fixedly generated at a determined position, and thus the coordinates thereof are determined in advance. Therefore, when the R, G, and B color information deviates from the nighttime threshold value D, it is determined that the mapping region is the whitened region rather than the fog region, and the mapping image is corrected by outputting an $(N+1)^{th}$ frame in the mapping image in the same manner as an $N^{th}$ frame from which the whitened region is removed.

Further, when the external light source is a moving light source, the coordinates of the whitened region are moved. Therefore, the system generates the corrected nighttime threshold value Dt and compares the corrected nighttime threshold value Dt with the original nighttime threshold value D to set the $(N-1)^{th}$ frame of the mapping image as the $N^{th}$ frame until the moving light source deviates from the image signal and output the $(N-1)^{th}$ frame, and thus the system corrects the mapping image.

Further, the above-described nighttime threshold may vary depending on the shape of the road, and thus a correction procedure for the nighttime threshold may be added.

Referring to FIG. 6, in the method of removing the whitened region from the mapping image performed by the nighttime road fog detection system according to the embodiment of the present invention, in the case of the moving light source for each point where the image is captured, the nighttime threshold value is corrected according to road conditions, and thus the occurrence of the whitened region is determined and the whitened region is removed.

As a procedure for the above, the system determines whether the road to be monitored is a straight road (S200), and when it is determined that the road to be monitored is the straight road, the system maintains the current original nighttime threshold value without correction (S210) and when it is determined that the road to be monitored is not the straight road but is a curved road or the like, the system performs first correction by subtracting a first correction variable from the original nighttime threshold value (S220).

Next, the system determines whether the road to be monitored is a horizontal road rather than the straight road (S230), and when it is determined that the road to be monitored is the horizontal road, the system uses the first-corrected nighttime threshold value (S240), and when it is determined that the road to be monitored is neither the straight road nor the horizontal road, the system performs second correction by further subtracting a second correction variable from the first-corrected nighttime threshold value (S250).

Hereinafter, the technical idea of the present invention will be described through comparison of a displayed image provided by a conventional system with a displayed image provided by the system according to the embodiment of the present invention.

Figure 7A:
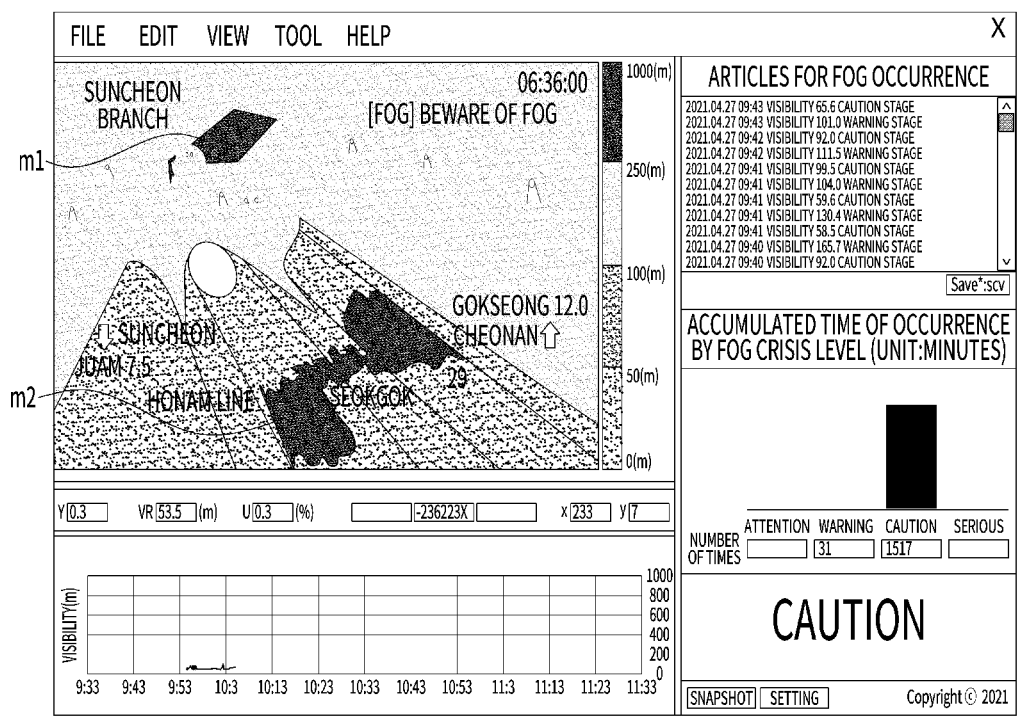
FIGS. 7A and 7B illustrate comparison diagrams of a mapping image obtained according to fog detection performed by a conventional system and a mapping image corrected according to the embodiment of the present invention.
Figure 7B:
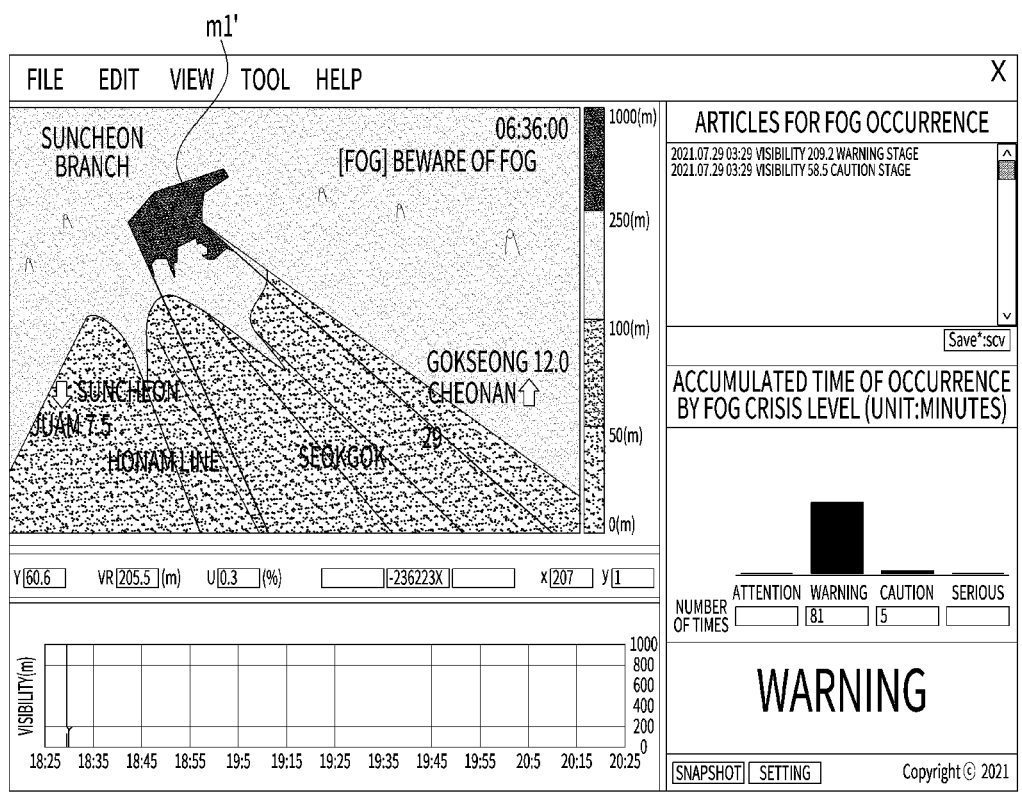

FIGS. 7A and 7B illustrate comparison diagrams of a mapping image obtained according to fog detection performed by a conventional system and a mapping image corrected according to the embodiment of the present invention.

Referring to FIGS. 7A and 7B, according to an original image of a CCTV which is displayed by the conventional fog detection system and a mapping image superimposed thereon, it can be seen that, in addition to a masking region m1 corresponding to a fog region detected by the fog detection system at night, an incorrectly detected masking region m2 corresponding to a whitened region generated by a headlight of a vehicle traveling on the road is also displayed. Further, since an area of the region detected as the fog region in the image is significantly increased, the intensity of fog generation is determined as "caution" (a).

Here, the intensity of fog generation is determined by calculating a distance of visibility for the detected fog region using an image visibility function. According to the Ministry of Land, Infrastructure, and Transport's fog crisis level visibility standards, when a distance of visibility VR is in a range of 250 m≤VR<1000 m, the intensity of fog generation may be determined as "attention," when the distance VR of visible is in a range of 100 m≤VR<250 m, the intensity of fog generation may be determined as "warning," when the distance VR of visible is in a range of 50 m≤VR<100 m, the intensity of fog generation may be determined as "caution," and when the distance VR of visible is in a range of VR<50 m, the intensity of fog generation may be determined as "serious."

Further, according to an embodiment of the present invention, in the original image of the CCTV which is displayed by the fog detection system and the mapping image superimposed thereon, when a moving light source is generated, as the current $N^{th}$ frame is displayed in the same manner as the previous $(N-1)^{th}$ frame, the image is displayed in the form in which the incorrectly detected masking region m2 is removed except for a previously detected fog region m1'. In addition, as the area of the region detected as the fog region in the image is relatively reduced, the intensity of fog generation is determined as "warning" (b).

According to an embodiment of the present invention, in a mapping image obtained by masking a fog region identified by a fog detection program on an image signal, a region incorrectly determined due to a whitening phenomenon caused by an external light source generated at night can be corrected, and thus information about the fog region can be more accurately provided in real time.

While many details have been described in the above description, these will be construed as exemplary embodiments rather than limiting the scope of the present invention. Therefore, the scope of the present invention is defined not by the described embodiment but by the appended claims, and encompasses equivalents that fall within the scope of the appended claims.

What is claimed is:

1. A nighttime road fog detection system comprising:
at least one processor configured to:
(i) search for and collect image signals obtained by photographing a road to be monitored from one or more closed-circuit television (CCTV) cameras installed at respective points on the road to be monitored in real time;
(ii) use a fog detection algorithm to determine edges of fog appearing in the image signals and identify a fog region from the determined edges;
(iii) extract red (R), green (G), and blue (B) color information for each pixel of the image signals from edges of the identified fog region, generate a mapping image including a masking region using the R, G, and B color information, superimpose the mapping image on the image signals, and output the image signals on which the mapping image is superimposed;
(iv) compare the R, G, and B color information with reference color information and set a nighttime threshold value for determining day or night; and
(v) remove a masking region corresponding to a whitened region generated by an external light source at night from the mapping image on the basis of the nighttime threshold value for each of the points at which the CCTV cameras are installed,
wherein step (v) detects R, G, and B color information of the fog region to assign X and Y coordinates to the fog region, classifies a region of the fog region, in which the X and Y coordinates are not changed for more than a certain period of time, as a fixed light source, and classifies a region of the fog region, in which the X and Y coordinates are changed, as a moving light source, and
wherein, when the fixed light source appears in the image signal, step (v) removes a masking region corresponding to the fixed light source from the mapping image, generates an $N^{th}$ frame (N is a natural number), and sets an $(N+1)^{th}$ frame to be the same as the $N^{th}$ frame.

2. The nighttime road fog detection system of claim 1, wherein step (i) uses an open information application program interface (API) that is provided by a public data portal to access the CCTV camera remotely and collect the image signal.

3. The nighttime road fog detection system of claim 1, wherein R, G, and B color information extracted from an image captured at sunrise by a CCTV camera installed at a highest altitude of a representative region among regions of a country is determined as the reference color information.

4. The nighttime road fog detection system of claim 1, wherein, when the moving light source appears in the image signal, step (v) corrects the nighttime threshold value according to environment setting information for each point and sets a previous $(N-1)^{th}$ frame in the mapping image, which is generated until the moving light source deviates from the image signal on the basis of the corrected nighttime threshold value, to be the same as an $N^{th}$ frame.

5. The nighttime road fog detection system of claim 4, wherein, when the road to be monitored is a straight road, the mapping corrector maintains the original nighttime threshold value, when the road is a curved road or a horizontal road, step (v) subtracts a first correction variable from the original nighttime threshold value, and when the road is not a horizontal road, the mapping corrector additionally subtracts a second correction variable from the nighttime threshold value from which the first correction value is subtracted.

6. The nighttime road fog detection system of claim 1, wherein, when a surrounding environmental factor such as snow or rain occurs, step (v) calculates difference values between R, G, and B edge values normally obtained from the image signal and R, G, and B edge values obtained from the image signal at a current time point for each R, G, and B, calculates an average value of the difference values, determines that a region, in which current R, G, and B color information is a certain level or more or a certain level or less based on the average value, is a noise region, and excludes the region from a whitened region.

* * * * *